United States Patent [19]

Shute et al.

[11] Patent Number: 5,788,027
[45] Date of Patent: Aug. 4, 1998

[54] TRIM SHOE

[75] Inventors: Bruce W. Shute, West End; Joseph Formolo, Laurinburg, both of N.C.

[73] Assignee: Westinghouse Air Brake Company, Wilmerding, Pa.

[21] Appl. No.: 870,877

[22] Filed: Jun. 6, 1997

[51] Int. Cl.⁶ .................................................. F16D 69/02
[52] U.S. Cl. ............................ 188/250 B; 188/251 M
[58] Field of Search ................................ 188/247, 250 R, 188/251 R, 251 A, 251 M, 250 B, 250 G; 264/122; 523/149, 156, 157, 158

[56] References Cited

U.S. PATENT DOCUMENTS

| | | | |
|---|---|---|---|
| 3,751,330 | 8/1973 | Gilbert | 188/251 A |
| 4,002,225 | 1/1977 | Marin | 188/251 A |
| 4,178,278 | 12/1979 | Reynolds, Jr. | 523/157 |
| 4,273,219 | 6/1981 | Ito | 188/251 M |
| 4,324,706 | 4/1982 | Tabe et al. | 523/149 |
| 4,352,750 | 10/1982 | Eschen | 523/156 |
| 4,781,275 | 11/1988 | Olsen | 188/251 A |
| 4,926,978 | 5/1990 | Shibata et al. | 188/251 M |
| 5,103,942 | 4/1992 | Schmitt | 188/251 M |
| 5,132,065 | 7/1992 | Christie | 214/122 |
| 5,325,941 | 7/1994 | Fariuacci | 188/251 M |
| 5,474,159 | 12/1995 | Soennecken et al. | 188/251 M |
| 5,576,369 | 11/1996 | Kudo et al. | 524/413 |

FOREIGN PATENT DOCUMENTS

| | | | |
|---|---|---|---|
| 0014339 | 1/1980 | Japan | 188/251 M |

*Primary Examiner*—Chris Schwartz
*Attorney, Agent, or Firm*—James Ray & Associates

[57] ABSTRACT

A composition brake shoe is used in a railway freight vehicle for reconditioning a wheel surface of a railway freight vehicle. Such brake shoe includes a brake surface having a predetermined configuration and a predetermined surface area. The composition brake shoe consists of a first friction composition material extending over the surface area of such composition brake shoe. A second friction type composition material is formed as a discrete insert, having a predetermined shape, and is molded into the first friction composition material. Such second friction composition material initially is completely embedded within the first friction composition material. One surface of the insert is disposed facing the predetermined surface area of the brake surface of the composition brake shoe. Such one surface of the insert being incrementally exposed as the first friction composition material is eroded away due to frictional engagement with the wheel tread surface during normal braking operations. The second friction composition material exhibits greater abrasive properties than the first friction composition material and consists essentially of a ceramic grinding material. Such first friction composition material extends entirely over the predetermined surface area of the brake surface of the composition brake shoe when the discrete insert has been worn away due to frictional engagement with the wheel tread surface during normal braking operations.

20 Claims, 2 Drawing Sheets

TRIM SHOE

FIELD OF THE INVENTION

The present invention relates, in general, to railway vehicle type braking equipment and, more particularly, this invention relates to a composition type brake shoe for use in a railway type vehicle brake system and, even still more specifically, the invention relates to an improved brake shoe member with an insert of aggressive high friction material for removing defects of the tread surface of a wheel while substantially minimizing a sparking condition during a brake application on such railway type vehicle.

BACKGROUND OF THE INVENTION

Prior to the conception and subsequent development of this invention, it is generally well known in the art to use various type brake shoes having different compositions to achieve quite specific braking requirements. For example, these compositions may include cast iron and various other type friction materials that are specifically formulated for a number of predetermined applications.

It is further well recognized, in the brake shoe art, that these various types of friction material will normally exhibit a number of uniquely different friction characteristics. Such friction characteristics, for example, include both high friction material and low friction material. Obviously, these different friction characteristics can have a significant effect on the distance that will be required to bring a railway type vehicle to a complete stop. Additionally, this stopping distance can be greatly affected by the various weather conditions that are normally encountered by the railway vehicle during operation, for example, wet or dry.

In many of the developed countries of the world there are certain critical requirements which are imposed on the stopping distance for a railway type vehicle. Such stopping distance imposed is obviously for safety reasons. Additionally, this stopping distance imposed must be capable of being achieved even in rather adverse weather conditions. For example, one of these critical requirements is that a train must possess the capability of being stopped even in wet conditions within about 15% of the normal stopping distance that would be achieved during operation in dry conditions. This particular requirement can generally be readily achieved through the use of a cast iron type brake shoe which will exhibit relatively low friction at normal operating speed and relatively high friction at low speed and in a static condition.

However, as is generally well known in the art, these cast iron brake shoes will normally generate a considerable amount of undesirable noise and dust during a brake application of a railway type vehicle. Consequently, as the population centers have expanded and people have moved nearer to the railroad track structures, this undesirable noise and dust has become a source of considerable concern to those persons who are located adjacent such track structures.

It is generally believed, by those persons who are skilled in the relevant railway vehicle braking art, that one means that could likely be utilized effectively to significantly reduce this undesirable noise to a generally more acceptable level would be to use a lower type friction composition in the manufacture of the brake shoes.

Although the use of such lower type friction material may be adequate for braking purposes, this type of brake shoe does not provide any benefit toward the reconditioning of a wheel tread surface that may have surface defects, such as shells or spalls. Removal of these surface defects will normally extend the useful life of a wheel that is in service.

A high friction brake shoe surface could be used which would be aggressive as far as reconditioning the wheel surface; however, this design has a disadvantage of creating significant sparking during brake applications which could result in a hazardous condition. Applicant is aware of another design which is a shoe material made entirely from the aggressive grinding type material, however, this shoe must be applied and then immediately removed after a very low speed brake application. Thus, there is a need for a brake shoe that will not present a safety problem because of a sparking condition while the brake shoe is reconditioning the defective surface of a wheel tread and still further a brake shoe that can continue to be used for normal braking operations after the wheel tread has been reconditioned.

SUMMARY OF THE INVENTION

The present invention provides a composition brake shoe for use on a railway freight vehicle for reconditioning a wheel tread surface during a normal braking application on such railway freight vehicle. The composition brake shoe includes a brake surface having a predetermined configuration and a predetermined surface area. It further includes a first friction type composition material extending over the surface area of such brake surface of such composition brake shoe. The composition brake shoe further contains a second friction type composition material formed as a discrete insert, having a predetermined shape, and molded into such first friction type composition material, such second friction type composition material initially being completely embedded within such first friction type composition material, one surface of such discrete insert being disposed facing such predetermined surface area of such brake surface of such composition brake shoe, such one surface of such discrete insert being incrementally exposed as such first friction type composition material is eroded away due to frictional engagement with such wheel tread surface during normal braking operations, such second friction type composition material exhibiting greater abrasive properties than such first friction type composition material, such second friction type composition material consists essentially of a ceramic grinding material, such first friction type composition material extending entirely over such predetermined surface area of such brake surface of such composition brake shoe after such second friction type composition material formed as such discrete insert has been worn away due to frictional engagement with such wheel tread surface during normal braking operations.

OBJECTS OF THE INVENTION

It is, therefore, one of the primary objects of the present invention to provide a brake shoe with an aggressive grinding material in a composition brake shoe matrix which will remove defects from the tread surface of a wheel during normal braking applications.

It is also an object of the present invention to provide a brake shoe which will at least substantially minimize production of a sparking condition while removing defects from the tread surface.

It is still another object of the present invention to provide a brake shoe which will extend the useful life of a wheel in service.

Yet, it is still another object of the present invention to provide a brake shoe which will provide the correct friction for braking while at the same time removing wheel tread surface defects.

Additionally, it is a further object of the present invention to provide a brake shoe which can be used to recondition a wheel tread and still remain in service on the railway freight vehicle until the shoe is fully worn.

In addition to the various objects and advantages of the present invention which have been described in some specific detail above, various additional objects and advantages of the invention will become much more readily apparent to those persons who are particularly skilled in the relevant brake shoe friction art from the following more detailed description of such invention, particularly, when such detailed description is taken in conjunction with the attached drawing FIGS. and with the appended claims.

Figure 1:
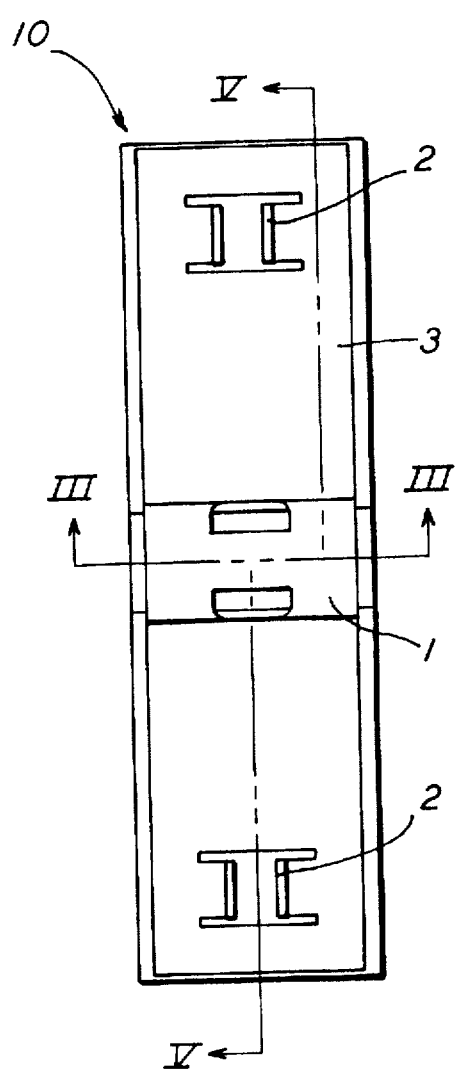
FIG. 1 is a plan view of the back of a conventional railway brake shoe showing a steel backing plate used for mounting a brake shoe to the railway vehicle.

BRIEF DESCRIPTION OF THE PRESENTLY PREFERRED AND VARIOUS ALTERNATIVE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing FIGS.

Figure 2:
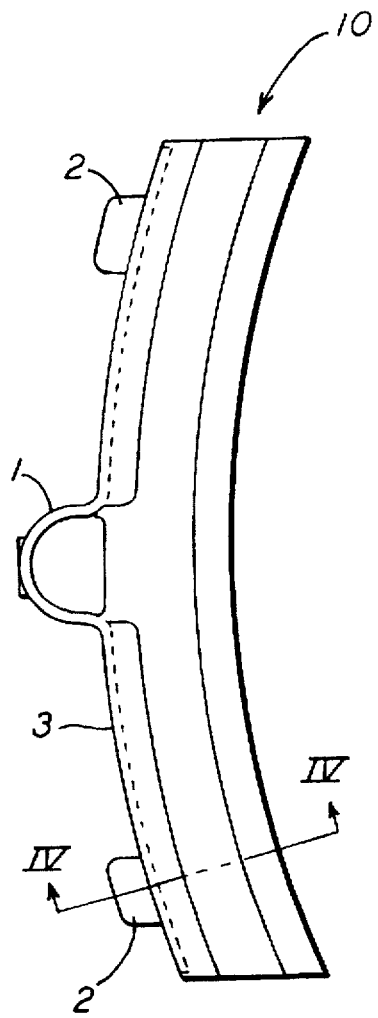
FIG. 2 is a side elevation view of the railway brake shoe illustrated in FIG. 1.

Reference is now made more specifically to FIGS. 1 and 2. Illustrated therein is a conventional brake shoe configuration, generally designated 10, capable of having an embodiment of the present invention incorporated therein. Brake shoe 10 includes a stirrup 1 connected to a backing plate 3 to which a composition type brake shoe member is secured. Brake shoe 10 further includes an abutment portion 2 which engages a key member (not shown). The backing plate 3 and abutment portion 2 are used to position and attach such brake shoe 10 to the brake head portion (not shown) of the brake beam portion of a predetermined brake system.

Figure 3:
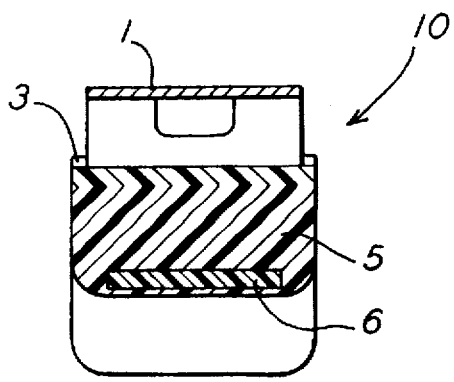
FIG. 3 is a cross sectional view of a railway brake shoe taken along the lines III—III of FIG. 1 which incorporates a presently preferred embodiment of the present invention therein.
Figure 4:
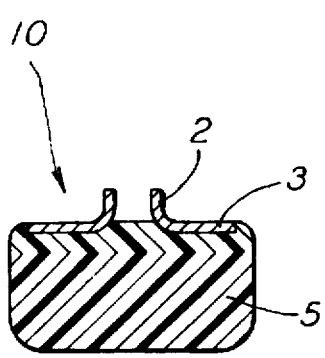
FIG. 4 is a cross sectional view of a railway brake shoe taken along the lines IV—IV of FIG. 2.
Figure 5:
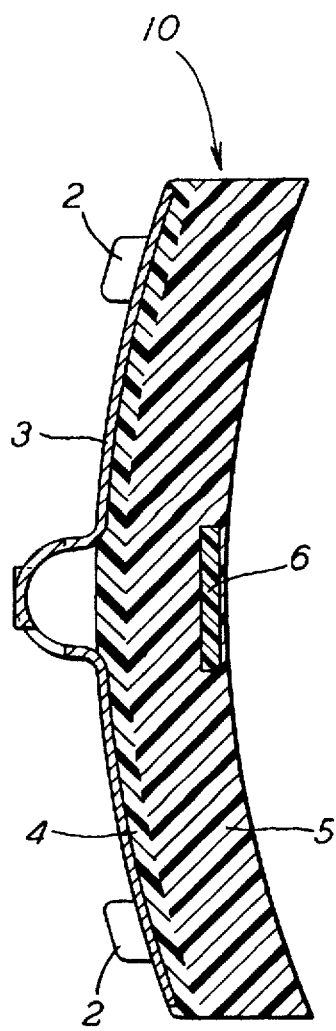
FIG. 5 is a cross sectional view of a railway brake shoe taken along the lines V—V of FIG. 1 which incorporates the presently preferred embodiment of the present invention therein.

Reference is now made more specifically to FIGS. 3, 4 and 5. FIGS. 3, 4 and 5 are cross sectional views taken along the lines III—III, IV—IV and V—V, respectively, of FIGS. 1 and 2. Illustrated therein is a presently preferred embodiment of the invention. As shown therein, brake shoe 10 has a steel backing plate 3, a backing stock layer 4 for bonding first friction type composition material 5 to backing plate 3. First friction type composition material 5 of the brake shoe 10, according to the present invention, is a composition friction type material which extends over the surface area of brake shoe 10 and provides the required friction and braking effort when forced against the tread of a railway wheel. The surface of such brake shoe 10, when used in a railway braking system, will exhibit a generally arcuate shape. First friction type composition material 5 will hereinafter be referred to as base material 5.

Embedded in such base material 5 is a discrete insert of a second friction type composition material 6. Such second friction type composition material 6 is formed as a discrete insert, having a predetermined shape, and is molded into base material 5. Second friction type composition material 6 initially is completely embedded within base material 5. One surface of such discrete insert of second friction type composition material 6 is disposed facing the predetermined surface area of the braking surface of the composition brake shoe 10. Such one surface of second friction type composition material 6 being incrementally exposed as base material 5 is eroded away due to frictional engagement with such wheel tread surface during normal braking operations. Second friction type composition material 6 exhibits greater abrasive properties than such base material 5. Such second friction type composition material 6 consists essentially of a ceramic grinding material used for grinding wheels.

Base material 5 again extends entirely over such predetermined surface area of such brake surface of such brake shoe 10 after such second friction type composition material 6, formed as a discrete insert, has been worn away due to frictional engagement with such wheel tread surface during normal braking operations.

In a presently preferred embodiment of the invention, such second friction type composition material 6 is a ceramic aluminum oxide grinding compound. It should be noted that second friction type composition material 6 will hereinafter be referred to as discrete insert 6.

In a preferred embodiment of the present invention such base material 5 is a composition friction material which comprises abrasive components selected from a group consisting of morganite, chromite, black iron oxide and silicon carbide and various mixtures thereof. These abrasive components being present in such base material 5 generally in a range of between about 35 and about 45 weight percent.

Base material 5 also includes inorganic fillers selected from a group consisting of clay, talc, and zinc oxide and various mixtures thereof. These inorganic fillers being present in base material 5 generally in a range of between about 18 and about 25 weight percent.

By Base material 5 further includes organic fillers and binders selected from a group consisting of mineral rubber, carbon filler, carbon black, liquid resin, cashew resin, SB rubber, and reclaimed brake composition material and various mixtures thereof. Such organic fillers and binders being present in base material 5 generally in a range of between about 30 and about 40 weight percent. Base material 5 also contains a number of crosslinking and curing agents selected from a group consisting of sulfur, hexamethylenetetramine, activators, accelerators and various mixtures thereof. Such crosslinking and curing agents are individually present in base material 5 generally in concentrations of 1 percent or less.

In a preferred embodiment of the invention such abrasive components are present in base material 5 generally in a range of between about 37 and about 40 weight percent, inorganic fillers are present generally in a range of between about 21 and about 23 weight percent and organic fillers and binders are present generally in a range of between about 36 and about 39 weight percent.

In a presently preferred embodiment of the invention such base material 5 is at least twice as aggressive toward the wheel tread as a conventional freight friction composition material used prior to the present invention.

Such brake shoe 10 is applied to a railway wheel (not shown) which may exhibit certain detrimental type defects on the tread surface of the wheel. These defects are called shells or spalls. As is evident in FIGS. 3 and 5 of brake shoe 10, such discrete insert 6 is surrounded by base material 5. As the outer surface of base material 5 wears away through normal braking operations, discrete insert 6 is incrementally exposed and during any subsequent braking operation provides enhanced grinding and reconditioning of the tread surface of such railway wheel. Such enhanced grinding and reconditioning continues until discrete insert 6 is worn away. However, the reconditioning of the wheel tread will continue, but to a lesser degree, even after discrete insert 6 has been worn away since the composition of such base material 5 is designed to be more aggressive toward a wheel tread than conventional composition freight brake shoes. Thus, the brake shoe 10, of the present invention, provides adequate braking while continuing to recondition a wheel tread, even after the discrete insert 6 is worn away, and remains a usable brake shoe at least to the condemning point of the shoe.

A center line of such one surface of the discrete insert 6 is preferably positioned perpendicular to a longitudinal axis of such brake surface of base material 5 and is disposed within base material 5 at a depth at such center line of between about 0.1 inch and about 0.3 inches from such brake surface of brake shoe 10. In a presently preferred embodiment of the invention, such center line of such one surface of discrete insert 6 is positioned along a center line of the brake shoe 10 that is positioned perpendicular to a longitudinal axis of such brake surface of brake shoe 10. In this presently preferred embodiment of the invention, the depth of such discrete insert 6 in base material 5 is between 0.125 and 0.25 inches at such center line.

According to the present invention such discrete insert 6 has a thickness of between about 0.125 inches and about 0.375 inches. In the presently preferred embodiment of the invention, however, such thickness of discrete insert 6 is between about 0.2 inches and about 0.3 inches.

Such discrete insert 6 is essentially a rectangular block in the presently preferred embodiment of the invention. Such block has a width of generally about 3 inches long at such center line of discrete insert 6. Such width is almost, but not completely, across the entire width of such brake shoe 10. In the presently preferred embodiment of the invention, discrete insert 6 further has a length of between about 1.5 inches and about 3 inches measured along the longitudinal face of brake shoe 10.

As is evident in FIGS. 3 and 5, discrete insert 6 is molded into such base material 5. As base material 5 is worn away through normal braking operations, discrete insert 6 becomes exposed and subsequently provides a more agressive abrasive machining effect on the wheel tread to remove surface defects. The thickness and abrasive characteristics of discrete insert 6 are controlled to provide enough accelerated wheel wear to clean defects (shells or spalls) from the wheel tread. In tests performed on railway wheels which exhibited severe surface defects, photographs of tread surfaces were taken before brake shoe 10, complete with base material 5 and base insert 6, was mounted as a replacement brake shoe. After a brake shoe with the instant invention was installed as the brake shoe 10, photographs were again taken after 210 stops at 40 miles per hour and again after 410 stops at 40 miles per hour. The photographs of the wheel surfaces indicated that visible defects were essentially eliminated after 410 total stops.

Further, AAR specification tests indicated that the stopping distance using brake shoes with the instant invention were well within the acceptable stopping distances for every speed tested. The average of the stopping distances were virtually at the midpoint of the AAR's specification limits. The tests were performed with both light and heavy braking. Thus, the instant invention not only reconditions severely defective wheel treads but can continue to provide adequate braking for the life of such brake shoe.

As described previously, base material 5 is also designed to be more aggressive to the wheel tread than a conventional composition brake shoe and will continue to provide cleaning and reconditioning of the tread surface of a wheel but at a much slower rate then that performed by discrete insert 6. This would be analogous to the use of coarse and fine grit paper in a sanding operation.

Although discrete insert 6, is shown in the drawing FIG. 5 and also described in the description above, as being positioned in base material 5 in the center of brake shoe 10, it is within the scope of the instant invention to place discrete insert 6 in other positions within base material 5 in brake shoe 10.

This complete process is designed to extend the useful life of a wheel in service. The process requires a minimum of wheel tread maintenance effort on a wheel, which has exhibited certain types of tread defects, since all that is required to recondition such wheel tread is the replacement of an existing brake shoe with a brake shoe 10 of the instant invention. The wheel tread surface is reconditioned during normal braking operations without any additional labor. Thus, brake shoe 10 reconditions the wheel tread surface and can remain on the railway vehicle for the life of the brake shoe. With the reconditioning of the wheel tread, the useful life of the wheel is extended significantly.

While both the presently preferred and a number of alternative embodiments of the present invention have been described in detail above it is understood that various other adaptations and modifications of the present invention can be envisioned by those persons who are skilled the relevant art of brake shoes without departing from either the spirit of the invention or the scope of the appended claims.

We claim:

1. A composition brake shoe for use on a railway freight vehicle for reconditioning a wheel tread surface of such railway freight vehicle during a normal braking application on such vehicle, said composition brake shoe comprising:

(a) a brake surface, for engaging a wheel tread, having a predetermined configuration and a predetermined surface area;

(b) a first friction composition material having a predetermined shape and at least initially extending entirely over said predetermined surface area of said brake surface of said composition brake shoe; and (c) a second friction composition material formed as a discrete insert, having a predetermined shape, and molded into said first friction composition material, said second friction composition material initially being completely embedded within said first friction composition material, one surface of said discrete insert being disposed facing said predetermined surface area of said brake surface of said composition brake shoe, said one surface of said discrete insert being incrementally exposed as said first friction composition material is eroded away due to frictional engagement with such wheel tread surface during normal braking operations, said second friction composition material exhibiting greater abrasive properties than said first friction composition material, said second friction composition material consists essentially of a ceramic grinding material, said first friction composition material extending entirely over said predetermined surface area of said brake surface of said composition brake shoe after said second friction composition material formed as said discrete insert has been worn away due to frictional engagement with such wheel tread surface during normal braking operations.

2. A composition brake shoe for use on a railway freight vehicle for reconditioning a wheel tread surface, according to claim 1, wherein said first friction composition material includes;
(a) abrasive components selected from the group consisting of morganite, chromite, black iron oxide, silicon carbide and various mixtures thereof, said abrasive components being present in said first friction composition material generally in a range of between about 35 and about 45 weight percent,
(b) inorganic fillers selected from the group consisting of clay, talc, zinc oxide and various mixtures thereof, said inorganic fillers being present in said first friction composition material generally in a range of between about 18 and about 25 weight percent,
(c) organic fillers and binders selected from the group consisting of mineral rubber, carbon filler, carbon black, liquid resin, cashew resin, SB rubber, reclaimed brake composite material and various mixtures thereof, said organic fillers and binders being present in said first friction composition material generally in a range of between about 30 and about 40 weight percent, and
(d) crosslinking and curing agents selected from the group consisting of sulfur, hexamethylenetetramine, accelerators, activators and various mixtures thereof, said crosslinking and curing agents being present individually in said first friction composition material generally in a concentration of about 1 weight percent or less.

3. A composition brake shoe for use on a railway freight vehicle for reconditioning a wheel tread surface, according to claim 2, wherein said abrasive components are present in said first friction composition material generally in a range of between about 37 and about 40 weight percent.

4. A composition brake shoe for use on a railway freight vehicle for reconditioning a wheel tread surface, according to claim 2, wherein said inorganic fillers are present in said first friction composition material generally in a range of between about 21 and about 23 weight percent.

5. A composition brake shoe for use on a railway freight vehicle for reconditioning a wheel tread surface, according to claim 2, wherein said organic fillers and binders are present in said first friction composition material generally in a range of between about 36 and about 39 weight percent.

6. A composition brake shoe for use on a railway freight vehicle for reconditioning a wheel tread surface, according to claim 1, wherein said discrete insert is generally a rectangular block.

7. A composition brake shoe for use on a railway freight vehicle for reconditioning a wheel tread surface, according to claim 6, wherein said discrete insert exhibits a thickness of generally between about 0.125 inches and about 0.375 inches.

8. A composition brake shoe for use on a railway freight vehicle for reconditioning a wheel tread surface, according to claim 6, wherein said thickness of said discrete insert is generally between about 0.2 inches and about 0.3 inches.

9. A composition brake shoe for use on a railway freight vehicle for reconditioning a wheel tread surface, according to claim 6, wherein said discrete insert is generally about 3 inches long at said center line of said discrete insert.

10. A composition brake shoe for use on a railway freight vehicle for reconditioning a wheel tread surface, according to claim 6, wherein said discrete insert has a length of between about 1.5 inches and about 2.5 inches along a longitudinal face of said brake shoe.

11. A composition brake shoe for use on a railway freight vehicle for reconditioning a wheel tread surface, according to claim 1, wherein a center line of said one surface of said discrete insert is positioned perpendicular to a longitudinal axis of said brake surface of said second friction type composition material disposed within said first friction type composition material at a depth at said center line of between about 0.1 inch and about 0.3 inches from said brake surface of said composition brake shoe.

12. A composition brake shoe for use on a railway freight vehicle for reconditioning a wheel tread surface, according to claim 11, wherein said center line of said one surface of said discrete insert is positioned along a center line of said composition brake shoe positioned perpendicular to said longitudinal axis of said brake surface of said composition brake shoe.

13. A composition brake shoe for use on a railway freight vehicle for reconditioning a wheel tread surface, according to claim 12, wherein said center line of said one surface of said discrete insert is positioned at a place on said composition brake shoe other than said center line of said composition brake shoe positioned perpendicular to said longitudinal axis of said brake surface of said composition brake shoe.

14. A composition brake shoe for use on a railway freight vehicle for reconditioning a wheel tread surface, according to claim 11, wherein said one surface of said discrete insert is disposed within said first friction type composition material at said depth at said center line of between about 0.125 inch and about 0.25 inches from said brake surface of said composition brake shoe.

15. A composition brake shoe for use on a railway freight vehicle for reconditioning a wheel tread surface, according to claim 1, wherein said first friction type composition material is bonded to a metal backing plate during molding.

16. A composition brake shoe for use on a railway freight vehicle for reconditioning a wheel tread surface, according to claim 15, wherein said metal backing plate includes means for securing said composition brake shoe to a brake beam disposed on such railway freight vehicle.

17. A composition brake shoe for use on a railway freight vehicle for reconditioning a wheel tread surface, according to claim 15, wherein said predetermined shape of said first friction type composition material is generally rectangular on an axis disposed perpendicular to that of a longitudinal axis of said brake shoe and said predetermined surface area of said brake surface exhibits a convex shape so as to conform to a surface of a wheel tread of a railway wheel and a surface radially opposed to said brake surface exhibits a concave shape for molding to said backing plate of said brake shoe and generally arcuate edges disposed along said longitudinal axis of said brake shoe.

18. A composition brake shoe for use on a railway freight vehicle for reconditioning a wheel tread surface, according to claim 1, wherein said predetermined configuration of said brake surface is arcuate.

19. A composition brake shoe for use on a railway freight vehicle for reconditioning a wheel tread surface, according to claim 1, wherein said first friction composition material is at least twice as abrasive toward such wheel tread surface as a conventional friction composition material for freight brake shoes.

20. A composition brake shoe for use on a railway freight vehicle for reconditioning a wheel tread surface, according to claim 1, wherein said ceramic grinding material is an aluminum oxide grinding compound.

* * * * *